United States Patent
Kemp et al.

(10) Patent No.: US 6,879,056 B2
(45) Date of Patent: Apr. 12, 2005

(54) CONVERTING SENSED SIGNALS

(75) Inventors: Christopher J. Kemp, Monument, CO (US); Christoph P. Menzel, Madison, CT (US)

(73) Assignee: Intel Corporation, Santa Clara, CA (US)

(*) Notice: Subject to any disclaimer, the term of this patent is extended or adjusted under 35 U.S.C. 154(b) by 464 days.

(21) Appl. No.: 09/751,993

(22) Filed: Dec. 29, 2000

(65) Prior Publication Data

US 2002/0117895 A1 Aug. 29, 2002

(51) Int. Cl.$^7$ ................................................. B60L 1/00
(52) U.S. Cl. ..................... 307/10.1; 280/735; 181/282; 73/1.37; 324/679
(58) Field of Search ........................ 307/10.1; 280/735; 181/282; 73/1.37; 324/679

(56) References Cited

U.S. PATENT DOCUMENTS

| | | | | |
|---|---|---|---|---|
| 4,457,179 A | * | 7/1984 | Antonazzi et al. ............. 73/701 |
| 4,642,555 A | * | 2/1987 | Swartz et al. ................ 324/677 |
| 4,736,629 A | * | 4/1988 | Cole ........................ 73/514.32 |
| 4,878,012 A | | 10/1989 | Schulte et al. |
| 4,917,199 A | * | 4/1990 | Loshbough ............. 177/210 C |
| 5,028,876 A | * | 7/1991 | Cadwell ........................ 73/724 |
| 5,163,326 A | * | 11/1992 | Frick ............................ 73/708 |
| 5,337,260 A | * | 8/1994 | Spangler ...................... 702/88 |
| 5,428,352 A | * | 6/1995 | Bennett .................. 340/870.37 |
| 5,454,266 A | * | 10/1995 | Chevroulet et al. ....... 73/514.18 |
| 5,495,414 A | * | 2/1996 | Spangler et al. .............. 701/45 |
| 5,528,520 A | | 6/1996 | Kemp |
| 5,541,437 A | * | 7/1996 | Watanabe et al. ........... 257/417 |
| 5,600,066 A | * | 2/1997 | Torregrosa ............... 73/514.18 |
| 5,627,316 A | * | 5/1997 | De Winter et al. ...... 73/514.32 |
| 5,629,629 A | * | 5/1997 | Tielert et al. ................ 324/679 |
| 5,751,154 A | * | 5/1998 | Tsugai ......................... 324/661 |
| 5,974,895 A | * | 11/1999 | Steger et al. ................. 73/769 |
| 5,986,497 A | * | 11/1999 | Tsugai ......................... 327/554 |
| 6,196,067 B1 | * | 3/2001 | Martin et al. ............. 73/514.32 |
| 6,278,283 B1 | * | 8/2001 | Tsugai ......................... 324/678 |
| 6,366,099 B1 | * | 4/2002 | Reddi .......................... 324/678 |
| 6,377,056 B1 | * | 4/2002 | Hanzawa et al. ........... 324/678 |
| 6,450,031 B1 | * | 9/2002 | Sakai et al. .............. 73/514.16 |
| 6,525,652 B2 | * | 2/2003 | Smith ....................... 340/425.5 |
| 6,639,414 B2 | * | 10/2003 | Lien ............................ 324/658 |
| 6,718,826 B2 | * | 4/2004 | Zarabadi et al. ......... 73/514.38 |

OTHER PUBLICATIONS

Kemp, Christopher J.; Spangler, Leland; Ford Microelectronics, Inc.; *An Accelerometer Interface Circuit*; May 3, 1995; pp. 1–4.

* cited by examiner

*Primary Examiner*—Robert L. DeBeradinis
(74) *Attorney, Agent, or Firm*—Trop, Pruner & Hu, P.C.

(57) ABSTRACT

A way of converting sensed signals to a desirable form of electrical signals is provided that includes providing an input signal to a common input terminal of a sensing block. The way comprises receiving a sensed signal from the sensing block in response to applying the input signal.

23 Claims, 4 Drawing Sheets

CONVERTING SENSED SIGNALS

BACKGROUND

This invention relates generally to converting sensed signals, such as acceleration and pressure, to a desirable form of electrical signals.

Sensors, such as impact sensors, may be used in a variety of applications, such as automotive airbag systems to protect passengers during collisions. Impact sensors, for example, may employ a variety of sense elements, such as dual capacitive sense elements or single capacitive sense elements. Sensing circuits that interface with dual capacitive sense elements may be less vulnerable to noise such as electromagnetic interference noise or power supply noise, partly because of the differential nature of the sensing circuits. While such differential sensing circuits may be less susceptible to noise, they tend to be rather expensive.

A more cost efficient approach may be to use single-ended circuits, which typically interface with single capacitive sense elements. However, single-ended circuits generally tend to be more susceptible to noise.

Thus, there is a need for a cost efficient way that may be less susceptible to noise to convert sensed signals into a desirable form of electrical signals.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

Figure 1:
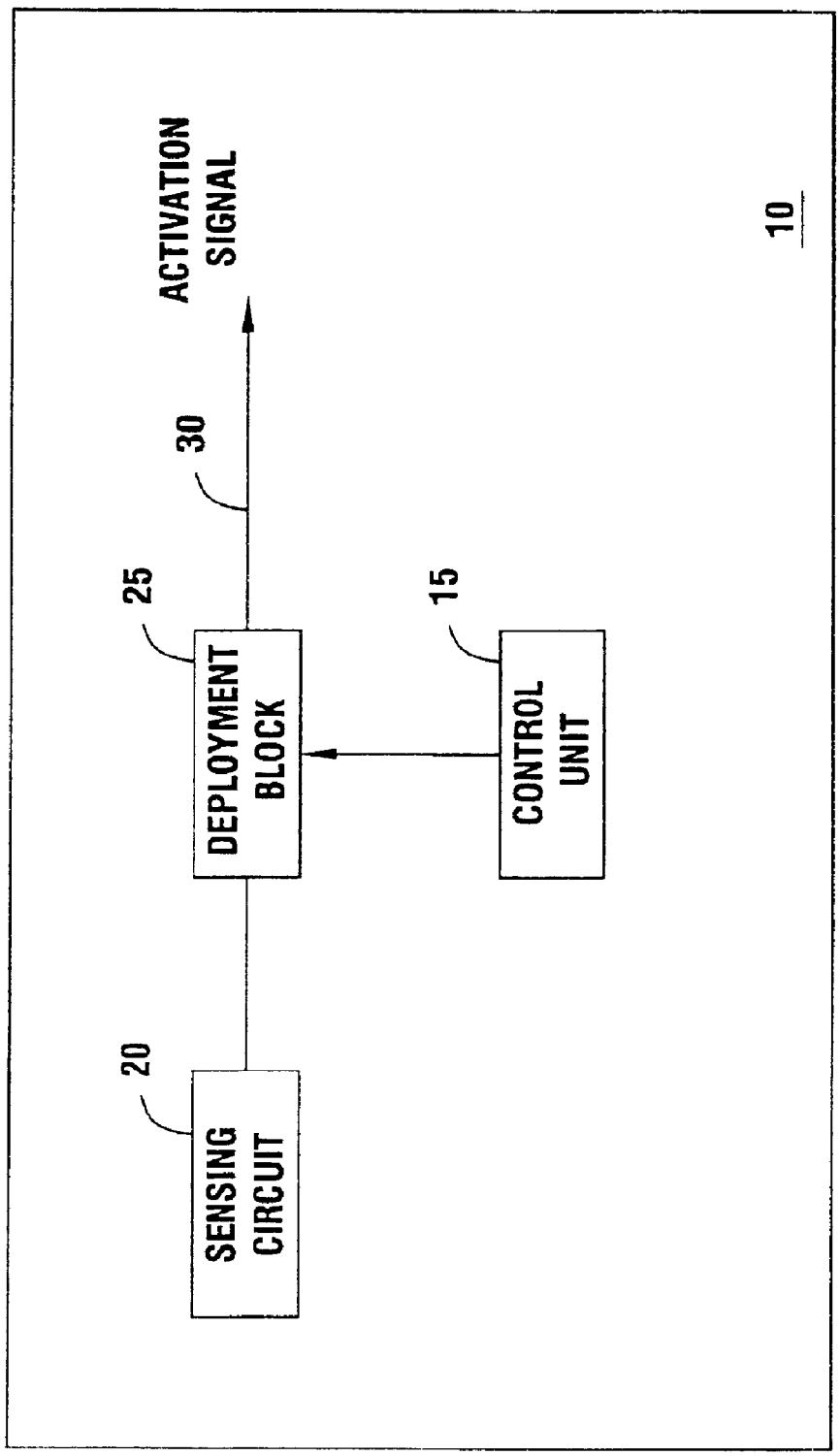
FIG. 1 is a stylized block diagram of a restraint system in accordance with one embodiment of the present invention.

Referring now to FIG. 1, a stylized block diagram of a restraint system 10 is illustrated in accordance with one embodiment of the present invention. The restraint system 10 may be employed in an automobile, for example, to protect passengers during collisions. In one embodiment, the restraint system 10 may automatically deploy an airbag in the event of an activation worthy impact event.

The restraint system 10 may include a control unit 15, a sensing circuit 20 and a deployment block 25. The control unit 15 may be a processor, in one embodiment. The sensing block 20 may, in one embodiment, provide a pulse density signal that may be indicative of a sudden acceleration or deceleration, for example. Based on the output of the sensing circuit 20, the deployment block 25 may determine, in one embodiment, whether an activation worthy impact event has occurred that may require action, such as deployment of airbags. If an activation worthy impact event occurs, the deployment block 25 may provide an activation signal on line 30, in one embodiment.

Figure 2:
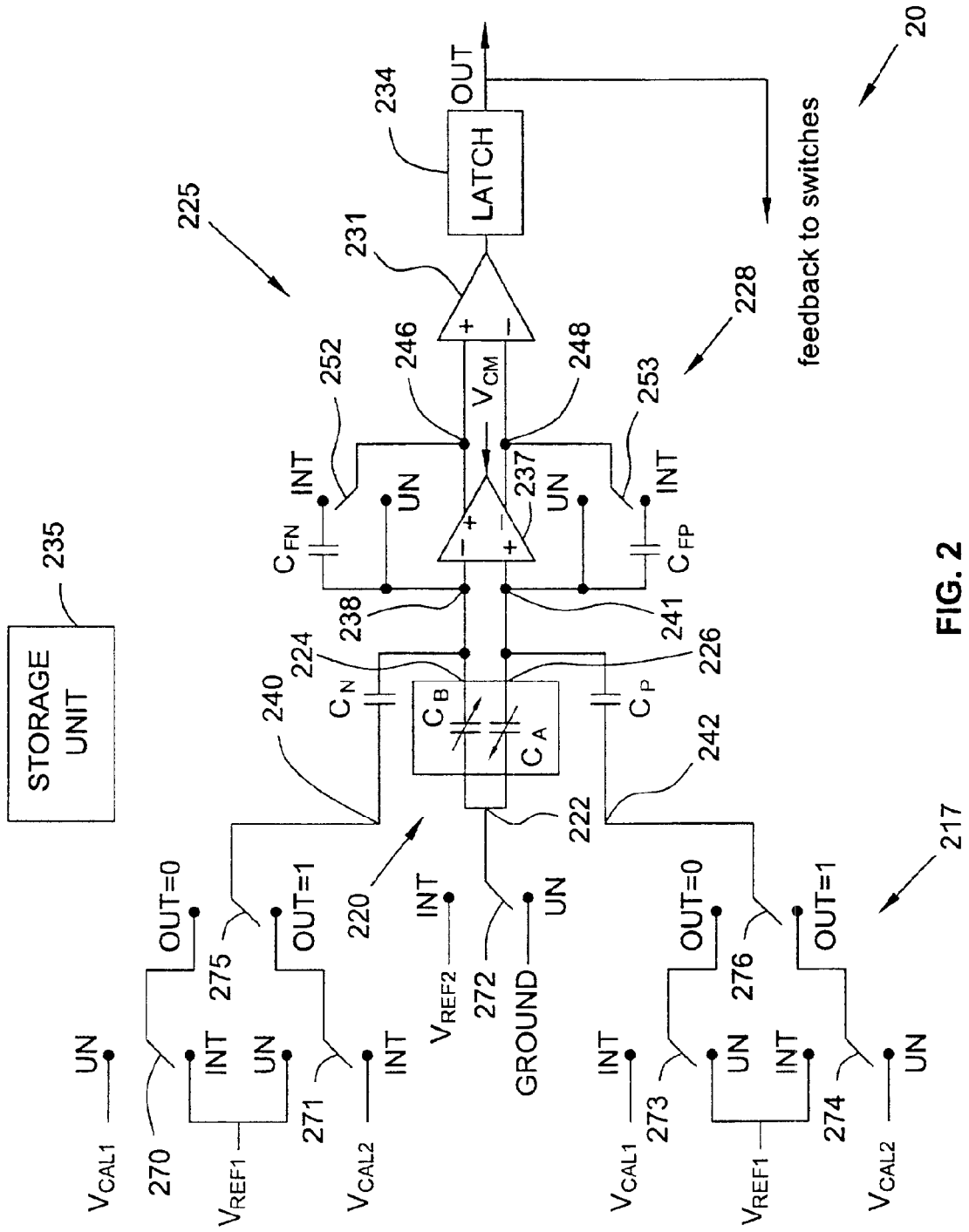
FIG. 2 is a schematic diagram of a sensing circuit that may be implemented in the restraint system of FIG. 1, in one embodiment.

Referring now to FIG. 2, a schematic diagram of one embodiment of the sensing circuit 20 of FIG. 1 is illustrated.

The use of the sensing circuit 20 may not be limited to the restraint system 10; rather, the sensing circuit 20 may be employed in any one of a variety of applications where converting sensed signals to other forms of electrical signals (e.g., digital signals) may be useful or desirable.

In one embodiment, the sensing circuit 20 includes an input block 217, a sensing block 220, and a converting block 225. As described in more detail below, the sensing circuit 20 converts an output signal from the sensing block 220 to a digital signal when pre-selected voltages are applied to the sensing block 220 and other nodes of the sensing circuit 20, in accordance with one embodiment of the present invention.

Figure 3:
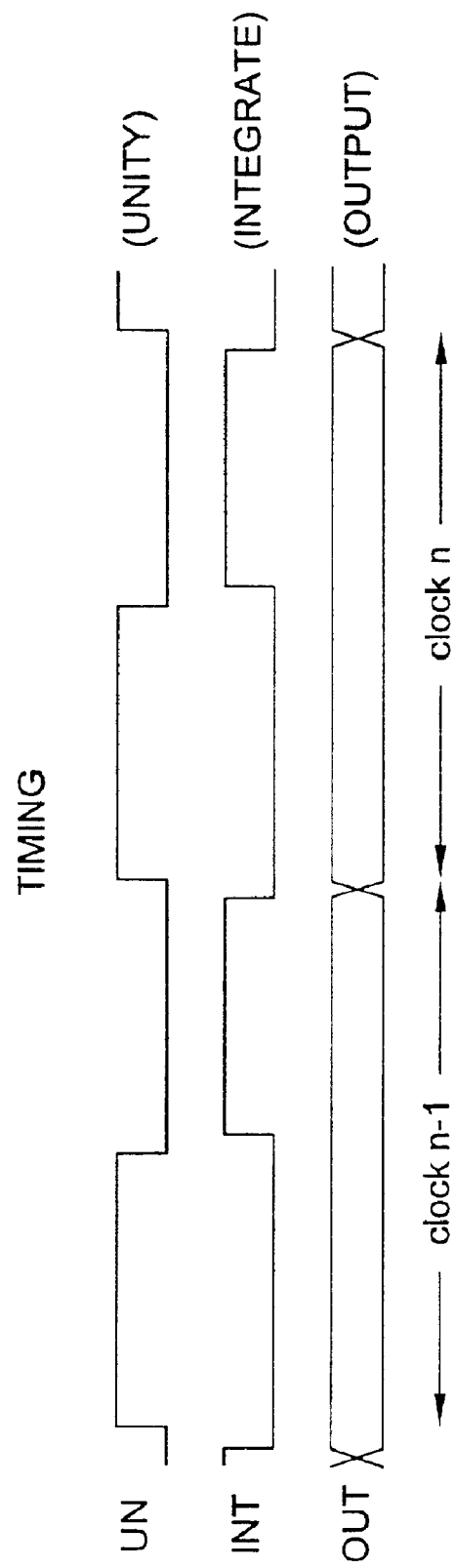
FIG. 3 is a timing diagram showing clock signals used in the sensing circuit of FIG. 2, in accordance with one embodiment of the present invention.

In one embodiment, two non-overlapping clocks, UN (unity) and INT (integrate), are used to clock the sensing circuit 20, as shown in FIG. 3. In one embodiment, during the UN clock cycles, selected nodes of the sensing circuit 20 are set to a predefined level, such as to a $V_{CM}$ voltage level, as shown in FIG. 3. In one embodiment, the sensing circuit 20 is clocked starting with the UN clock. FIG. 3 illustrates an output signal, OUT, which is the output of the sensing circuit 20, as described below in more detail.

Referring again to FIG. 2, although not so limited in the illustrated embodiment, the sensing block 220 includes two capacitors, $C_A$ and $C_B$, connected at a common node. The upward arrow through capacitor $C_A$ indicates that the $C_A$ capacitance may increase in response to an input, which, in one embodiment, may represent acceleration. The term "acceleration," as utilized herein, may include deceleration, in one embodiment. The downward arrow through capacitor $C_B$ indicates that the $C_B$ capacitance may decrease in response to an input signal. In one embodiment, the sensing block 220, upon sensing acceleration, provides an output signal to the converting block 225. The sensing block 220, in one embodiment, has an input terminal 222 and two output terminals 224, 226. The input terminal 222, in one embodiment, is a common node to the $C_A$ and $C_B$ capacitors.

The converting block 225, in one embodiment, includes an integrator 228 coupled to a comparator 231, which may be further coupled to a latch 234. A differential operational amplifier (opamp) 237, along with feedback capacitors, $C_{FN}$ and $C_{FP}$, forms the integrator 228, in the illustrated embodiment. In one embodiment, an applied direct current (DC) voltage, $V_{CM}$, to the opamp 237 sets a common-mode level of the integrator 228. In one embodiment, the $V_{CM}$ voltage may be one-fourth or one-third of the supply voltage, which, for example, may be 5 volts.

In one embodiment, integrator 228 is configured in a manner such that input terminals 238, 241 of the integrator 228 are held essentially constant at the $V_{CM}$ voltage level. In one embodiment, output terminals 246, 248 of the integrator 228 are held essentially constant at the $V_{CM}$ voltage level, during the UN clock cycle. The input terminals 238, 241 of the integrator 228, in one embodiment, are coupled to the respective output terminals 224, 226 of the sensing block 220. In one embodiment, one or more bond wires may be used to connect the sensing block 220 to the integrator 228 of the converting block 225.

The feedback capacitor, $C_{FN}$, may be coupled between the output terminal 246 and the input terminal 238 of the integrator 228. The feedback capacitor, $C_{FP}$, may be coupled between the output terminal 248 and the input terminal 241 of the integrator 228.

The integrator 228, in one embodiment, includes two switches 252, 253. During the INT clock phase or cycle (see FIG. 3), the switch 252 is in the "INT" (i.e., up) position, and during the UN phase, the switch 252 is in the "UN" (i.e., down) position, in one embodiment. Similarly, during the INT phase, the switch 253 is in the "INT" position, and during the UN phase, the switch 253 is in the "UN" position, in one embodiment.

The output terminals 246, 248 of the integrator 228 are coupled to respective input terminals of the comparator 231. The comparator 231, in one embodiment, provides an output signal that is a digital "1" if the voltage difference between the output terminals 246, 248 of the integrator 228 is positive, and a digital "0" if it is negative. The differential output voltage (i.e., the voltage at the output terminal 246 minus the voltage at the output terminal 248) of the integrator 228 is denoted herein as $V_{OD}$. The output of the comparator 231 is provided to the latch 234, in one embodiment. The latch 234 transfers a "0" or "1" at its input terminal to its output terminal on each falling edge of the INT clock phase (see FIG. 3), in one embodiment. The output signal (OUT) of the latch 234 may be a digital bit stream that is fed back into the switches (discussed below) of the input block 217. In one embodiment, the output of the latch 234 is the output of the sensing circuit 20. The density of 1's in the OUT signal may be an indication of the magnitude of the amplitude of the input signal to the sensing block 220. That is, if the OUT signal contains no 1's, for example, the input signal (e.g., acceleration) arriving at the sensing block 220 may be at the low end of its range. If, on the other hand, the OUT signal contains all 1's, the input signal of the sensing block 220 may be at a high end of its range. An OUT signal containing 1's on roughly 50% of the clock cycles, for example, may represent that the input signal to the sensing block 220 may be in the middle of the range.

In one embodiment, three reference voltages, $V_{REF1}$, $V_{REF2}$, and GROUND, are applied to the sensing circuit 20 at various nodes through the input block 217. In one embodiment, $V_{REF2}$ may be substantially equal to the supply voltage (not shown) of the sensing circuit 20. The supply voltage, for example, may be 5 volts in one instance. $V_{REF1}$ in one embodiment may be approximately twenty percent of $V_{REF2}$, thus, if $V_{REF2}$ is 5 volts, then $V_{REF1}$ may be 1 volt, for example.

The sensing circuit 20, in one embodiment, may be calibrated with calibration voltages, $V_{CAL1}$ and $V_{CAL2}$. In some instances, it may be difficult to fabricate the sensing block 220 with tight tolerances. As such, the sensing circuit 20 may be calibrated by adjusting the $V_{CAL1}$ and $V_{CAL2}$ voltages during a calibration operation after the sensing circuit 20 is assembled. During calibration, $V_{CAL1}$ and $V_{CAL2}$ voltages may be set to values that bring the sensitivity and offset calibration parameters of the sensing circuit 20 within a desirable specification range. After calibration, the $V_{CAL1}$ and $V_{CAL2}$ voltages may remain fixed for the lifetime of the sensing circuit 20.

In one embodiment, a storage unit 235 of the sensing circuit 20 may store the voltages $V_{CAL1}$ and $V_{CAL2}$ in digital form. The storage unit 235 may be a non-volatile programmable memory, such as electrically erasable programmable read-only memory (EEPROM), fuse-blowing memory, or zener-zapping memory.

The input block 217 in the illustrated embodiment includes seven switches 270–276 that are operated by the UN, INT, and OUT digital signals, as shown in FIG. 2. The switches 270–274 are connected to the node labeled "UN" when the UN signal is high (see FIG. 3), and to the node labeled "INT" when the INT signal is high, in one embodiment. The switches 275–276 are connected to the top node (labeled "OUT=0") when the output of the sensing circuit 20 is low, and to the lower node (labeled "OUT=1") when the output of the sensing circuit 20 is high, in one embodiment.

During the UN and INT clock phases, the switch 270 may receive $V_{CAL1}$ and $V_{REF1}$ voltages, respectively. An output terminal of the switch 270 is coupled to a first input terminal of the switch 275, in one embodiment. During the UN and INT clock phases, the switch 271 may receive $V_{REF1}$ and $V_{CAL2}$ voltages, respectively. In one embodiment, an output terminal of the switch 271 is coupled to a second input terminal of the switch 275. An output terminal of the switch 275 is coupled to a node 240 of the sensing circuit 20, in one embodiment.

During the UN and INT clock phases, the switch 273 may receive $V_{REF1}$ and $V_{CAL1}$ voltages, respectively. An output terminal of the switch 273 is coupled to a first input terminal of the switch 276, in one embodiment. During the UN and INT clock phases, the switch 274 may receive $V_{CAL2}$ and $V_{REF1}$ voltages, respectively. An output terminal of the switch 274 is coupled to a second input terminal of the switch 276, in one embodiment. An output terminal of the switch 276 may be coupled to a node 242 of the sensing circuit 20.

During the UN and INT clock phases, the switch 272 may be coupled to GROUND and $V_{REF2}$, respectively. Thus, during the UN clock phase, the input terminal 222 of the sensing block 220 is coupled to GROUND, in one embodiment. During the INT clock phase, the $V_{REF2}$ voltage is applied, in one embodiment, to the input terminal 222 of the sensing block 220. In one embodiment, as can be seen in FIG. 2, the same input signal (e.g., $V_{REF2}$ or GROUND voltage level) is applied to the common input terminal 222 of the $C_A$ and $C_B$ capacitors of the sensing block 220.

In one embodiment, an input capacitor $C_N$ is coupled between the node 240 and the input terminal 238 of the integrator 228, and an input capacitor $C_P$ is coupled between the node 242 and the input terminal 241 of the integrator 228. The input capacitors, $C_N$ and $C_P$, and the capacitors $C_A$ and $C_B$, of the sensing block 220, in one embodiment, deliver charge to (or extract charge from) the feedback capacitors, $C_{FN}$ and $C_{FP}$, of the integrator 228 during the INT clock phases, in response to the voltage changes at the nodes 240, 242 and at the input terminal 222 of the sensing block 220. The switches 270–274 may cause the voltage changes at the nodes 240, 242 and the input terminal 222 of the sensing block 220, when the switches 270–274 change from the UN position to INT position, for example.

The operation of the sensing circuit 20 is described below. During the UN clock phase, the opamp 237 is switched into unity-gain feedback configuration, which means that the voltages at input terminals 238, 242 and output terminals 246, 248 of the opamp 237 are at the level of the common-mode voltage, $V_{CM}$, in one embodiment. Also, in one embodiment, during the UN phase, the voltages on the nodes 240, 242 and the input terminal 222 of the sensing block 220 are driven to levels determined by the value of the OUT signal. The value of the OUT signal, in one embodiment, depends on the polarity of $V_{OD}$ (the integrator's differential output voltage) at the end of the previous INT phase. In one embodiment, the UN phase should be of an adequate duration to allow the voltage levels in the sensing circuit 20 to settle to a static level. In one embodiment, the duration may be one microsecond.

When the UN clock phase ends, the switches 270–274 and 252-253 open, and then close to the INT phase connections, in one embodiment. During the INT clock phase, in one embodiment, the feedback capacitors $C_{FN}$ and $C_{FP}$ are connected around the opamp 237. In one embodiment, the $C_{FN}$ and $C_{FP}$ feedback capacitors may still have a stored voltage as a result of the integrated charge from previous INT phases.

As mentioned above, both the input capacitors ($C_N$ and $C_P$) and the sense element capacitors ($C_A$ and $C_B$) may deliver charge to (or extract charge from) the feedback capacitors ($C_{FN}$ and $C_{FP}$) in response to the change in position of the switches 270–274. When some or all of the voltages settle to essentially static values at the end of the INT phase, the value of $V_{OD}$ may have changed to a new value. If this new value is positive, then the OUT signal may be a "1" for the next clock cycle. If the new value is negative, then the OUT signal may be a "0" for the next clock cycle.

Providing the OUT signal to the switches 275–276 causes the output voltage ($V_{OD}$) of the integrator 228 to change (on the INT phase) in a direction that tends to cause the OUT signal to change states (e.g., from zero to one, or vice-versa), in one embodiment. In other words, if $V_{OD}$ on a given clock cycle is positive, then on the next clock cycle it may be either less positive or negative. And if $V_{OD}$ on a given clock cycle is negative, then on the next clock cycle it may be either less negative or positive.

In one embodiment, the value of ($C_A$–$C_B$), which is the response of the sensing block differential capacitance to the input excitation, may affect the size of the charge packets delivered to the integrator 228 on each clock cycle, and ultimately affect the fraction of the OUT signal clock cycles that deliver 1's. This fractional pulse density (FPD) is the value of the output signal of the sensing circuit 20, in one embodiment. The FPD, in one embodiment, is defined as the number of clock periods per second having a high output value, divided by the clock frequency.

In one embodiment, during non-triggering events (e.g., no sudden change in acceleration, pressure, etc.), the output of the sensing circuit 20 may be a series of alternating ones and zeros. In the event of a triggering event (e.g., existence of sudden acceleration), there may be an increase in capacitance of capacitor $C_A$ and a decrease in capacitance of capacitor $C_B$ within the sensing block 220, in one embodiment. This differential capacitance ($C_A$–$C_B$), in one embodiment, may cause the sensing circuit 20 to output more ones than zeros for a selected time interval.

Figure 4:
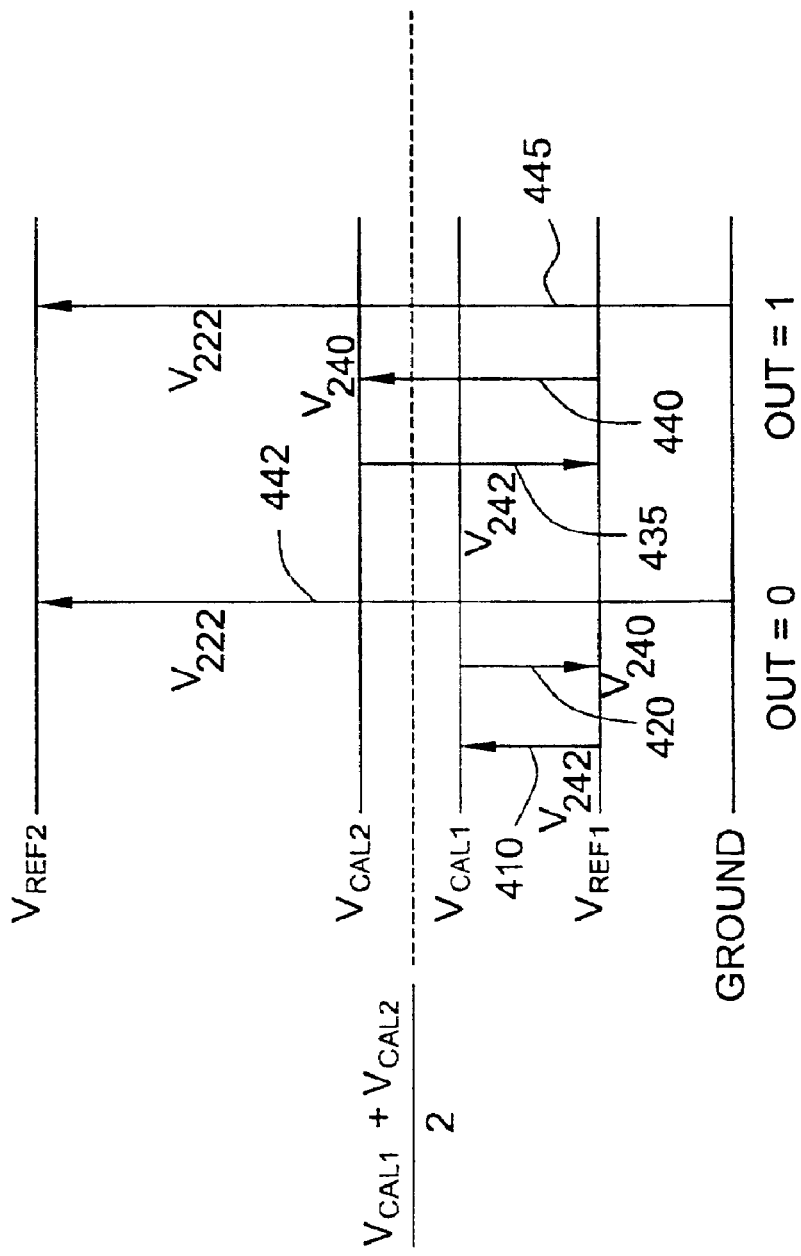
FIG. 4 is a graphical illustration of voltages and transitions of selected nodes of the sensing circuit of FIG. 2, in accordance with one embodiment of the present invention.

Referring now to FIG. 4, a graphical illustration of the voltage levels and transitions that may be applied to various nodes of the sensing circuit 20 is shown in one embodiment, for both values of the OUT signal. In one embodiment, when the OUT signal is a "0," it is an indication that the value of the differential output voltage at the end of the previous INT phase (e.g., $V_{OD}$ [n–1]) of the integrator 228 was less than zero. In one embodiment, for the nodes 222, 240, and 242 of the sensing circuit 20, the tails of the arrows represent voltage levels during the UN phase, while the arrowheads represent voltage levels during INT phase. In one embodiment, the actual voltage transitions may occur during the INT clock phase; voltages applied during the UN phase may be viewed, in one embodiment, as starting points for the voltage transitions.

As shown in FIG. 4, if the OUT signal is "0," then on the present clock cycle the voltage on the node 242 may be driven to the level of $V_{REF1}$ during the unity (UN) clock phase, and then may be driven to the level of $V_{CAL1}$ (line 410) during the integrate (INT) clock phase. Similarly, the voltage on the node 240 may transition from $V_{CAL1}$ to $V_{REF1}$ (line 420) during the INT phase. These voltage transitions may be verified with reference to FIGS. 2 and 3, for example. When the OUT signal is "1," the voltage on the node 242 may transition from $V_{CAL2}$ to $V_{REF1}$ (line 435), while the voltage on the node 240 may transition from $V_{REF1}$ to $V_{CAL2}$ (line 440).

As can be seen with reference to FIG. 4, in one embodiment, the voltage at the input terminal 222 of the sensing element 220 transitions from ground to $V_{REF2}$ (lines 442, 445) on every clock cycle independent of the value of the OUT signal.

In one embodiment, applying the above described selected voltages to the sensing circuit 20 may result in a desirable FPD transfer function, as shown in more detail below. The FPD of the sensing circuit 20 may be derived as follows:

During the clock cycles for which OUT=0, the charge delivered on the INT phase (or clock) to the node 241 (and eventually to the $C_{FP}$ feedback capacitor) by the voltage transitions at the nodes 242 and 222 may be defined by equation (1) below:

$$Q_{LP} = C_P\left(\frac{1}{2}V_{DG} - \frac{1}{2}V_{DIF}\right) + C_A(V_{REF2}) \qquad \text{Equation (1)}$$

where $V_{DIF}$ represents the difference between the two calibration voltages(i.e., $V_{CAL2}$–$V_{CAL1}$) and $V_{DG}/2$ represents the difference between the average of the two calibration voltages and $V_{REF1}$ $$\left(\text{i.e., } \frac{V_{DG}}{2} = \frac{V_{CAL1} + V_{CAL2}}{2} - V_{REF1}\right).$$

During the clock cycles for which OUT=0, the charge extracted during the INT phase from the node 238 (and from the $C_{FN}$ feedback capacitor) by the voltage transitions on the nodes 240 and 222 may be defined by equation (2) below:

$$Q_{LN} = C_N\left(\frac{1}{2}V_{DG} - \frac{1}{2}V_{DIF}\right) - C_B(V_{REF2}) \qquad (2)$$

The delivery and extraction of the above charges cause the output of the integrator 228 to change during the INT clock phase, as defined in equation (3) below:

$$\Delta V_{ODL} = \frac{C_P\left(\frac{1}{2}V_{DG} - \frac{1}{2}V_{DIF}\right) + C_A(V_{REF2})}{C_{FP}} + \frac{C_N\left(\frac{1}{2}V_{DG} - \frac{1}{2}V_{DIF}\right) - C_B(V_{REF2})}{C_{FN}} \qquad (3)$$

where $\Delta V_{ODL}$ is the change in the integrator output voltage when the OUT signal is low.

Assuming that $C_P=C_N=C_{IN}$ and that $C_{FP}=C_{FN}=C_F$ in one embodiment, then equation (3) becomes:

$$\Delta V_{ODL} = \frac{(2C_{IN})\left(\frac{1}{2}V_{DG} - \frac{1}{2}V_{DIF}\right) + (C_A - C_B)(V_{REF2})}{C_F} \qquad (4)$$

During the clock cycles for which OUT=1, the output of the integrator 228 may be similarly determined, as shown in equation (5) below:

$$\Delta V_{ODH} = \frac{-(2C_{IN})\left(\frac{1}{2}V_{DG} + \frac{1}{2}V_{DIF}\right) + (C_A - C_B)(V_{REF2})}{C_F} \quad (5)$$

In one embodiment, the fractional pulse density may be related to the above output voltage changes by equation (6):

$$FPD = \frac{1}{1 - \frac{\Delta V_{ODH}}{\Delta V_{ODL}}} \quad (6)$$

Substituting equations (4) and (5) into equation (6), and then simplifying, yields equation (7) below:

$$FPD = \frac{1}{2} - \frac{1}{2}\frac{V_{DIF}}{V_{DG}} + \frac{V_{REF2}}{2V_{DG}C_{IN}}(C_A - C_B) \quad (7)$$

The FPD, based on equation (7), may be generalized as shown in Equation (8) below:

$$FPD = B + G[C_A - C_B] \quad (8)$$

where $$B = \frac{1}{2} - \frac{1}{2}\frac{V_{DIF}}{V_{DG}} \quad \text{and} \quad G = \frac{V_{REF2}}{2V_{DG}C_{IN}}.$$

The equations (7) and (8), in one embodiment, illustrate how the sensing circuit 20 may be calibrated. The sensitivity calibration value may be adjusted by altering $V_{DG}$, which may entail raising or lowering both of the calibration voltages together, in one embodiment. Adjusting $V_{DG}$ may increase or decrease "G" in equation (8). Upon setting the sensitivity value, the offset calibration value may be adjusted by changing $V_{DIF}$, which may entail raising or lowering the calibration voltages in opposite directions, in one embodiment. Altering $V_{DIF}$ may increase or decrease "B" in equation (8).

One or more embodiments of the present invention may be cost efficient to produce and may also be less susceptible to noise. The cost savings may result since the sensing circuit 20 in one or more embodiments may employ a single sense element, which may be less expensive than dual sense elements. Additionally, one or more embodiments of the present invention may require fewer bondpads and/or wirebonds during manufacturing. In one embodiment, coarse calibration may be performed on the sensing circuit 20 by adjusting the input capacitors, $C_P$ and $C_N$, with a metal mask.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above might be altered or modified and all such variations are considered within the scope and spirit of the invention. Accordingly, the protection sought herein is as set forth in the claims below.

What is claimed is:

1. An apparatus comprising:
    an input block to apply an input signal to a common input terminal of a sensing block, the input block coupled to apply a first signal to the common input terminal during a first clock phase of a first clock and a second signal during a second clock phase of a second clock; and
    a converting block to receive a sensed signal from the sensing block in response to the input signal.

2. The apparatus of claim 1, wherein the converting block is coupled to provide an output signal based on the sensed signal.

3. The apparatus of claim 1, wherein the converting block comprises an integrator to integrate the sensed signal and provide a first output signal and a second output signal.

4. The apparatus of claim 3, wherein the converting block is further configured to compare the first output signal and the second output signal and provide an output signal.

5. The apparatus of claim 4, wherein the converting block is coupled to provide the output signal to the input block.

6. The apparatus of claim 1, wherein the input block comprises a first input capacitor and a second input capacitor, wherein the input block is coupled to provide a first input signal into the converting block through the first input capacitor and a second input signal into the converting block through the second input capacitor.

7. The apparatus of claim 1, further comprising a storage unit to store one or more voltage values to couple to a first input capacitor and a second input capacitor of the apparatus.

8. The apparatus of claim 7, wherein the voltage values comprise calibration voltages, the calibration voltages to couple to a first input capacitor and a second input capacitor.

9. The apparatus of claim 1, wherein the sensing block comprises a pair of output terminals to provide the sensed signal.

10. The apparatus of claim 1, wherein the first clock and the second clock are non-overlapping.

11. A method comprising:
    providing a first signal to a common input terminal of a sensing block during a first clock phase of a first clock and a second signal to the common input terminal during a second clock phase of a second clock, wherein the first clock phase and the second clock phase have non-overlapping clock cycles;
    receiving a sensed signal from the sensing block based on providing the first signal and the second signal; and
    providing a signal based on the sensed signal.

12. The method of claim 11, comprising integrating the sensed signal and providing a first output signal and a second output signal.

13. The method of claim 12, comprising comparing the first output signal and the second output signal to provide an output signal.

14. The method of claim 13, comprising providing the first signal and second signal based at least in part on the output signal.

15. The method of claim 11, further comprising directly providing the first signal using a first reference voltage and the second signal using a second reference voltage.

16. The method of claim 11, further comprising calibrating the sensing block using a first input capacitor and a second input capacitor.

17. A restraint system, comprising:
    a sensing circuit to:
    apply an input signal to a common input terminal of a sensing block;
    receive a sensed signal from the sensing block in response to applying the input signal; and provide an output signal based at least in part on the sensed signal;

a deployment block to provide an activation signal based at least in part on the output signal from the sensing circuit; and a control unit to provide a control signal to the deployment block.

18. The restraint system of claim 17, wherein the deployment block is coupled to provide the activation signal to activate an airbag.

19. The restraint system of claim 17, wherein the sensing circuit is coupled to be clocked via a plurality of non-overlapping clocks.

20. The restraint system of claim 17, wherein the sensing circuit is configured to provide a digital signal.

21. The restraint system of claim 17, wherein the sensing circuit is coupled to provide a signal having a fractional pulse density that is indicative of acceleration.

22. The restraint system of claim 17, further comprising a storage unit to store one or more voltage values to apply to the sensing circuit.

23. The restraint system of claim 17, wherein the sensing block comprises a pair of output terminals to provide the sensed signal.

* * * * *